United States Patent Office
3,194,860
Patented July 13, 1965

3,194,860
MANUFACTURE OF REINFORCED CONDUCTIVE PLASTIC GASKETS
John E. Ehrreich, Arlington, Mass. (315 Langly Road, Newton, Mass.), and Donald H. Avery, Boston, Mass. (19 Baker Road, Nahant, Mass.)
No Drawing. Filed Oct. 23, 1962, Ser. No. 232,566
6 Claims. (Cl. 264—154)

This application is a continuation in part of Serial No. 143,619 "Conductive Fillers for Plastics" filed October 9, 1961, and of Serial No. 153,078 "Conductive Metal Fillers for Plastics" filed November 17, 1961 by the present inventors. Both applications have been abandoned.

This invention pertains to a metal-filled conductive plastic gasket or seal useful for waveguide assemblies, weather-tight R.F. enclosures and the like. It is more particularly concerned with a flat gasket die-cut from a sheet of an elastomer loaded with a conductive metal powder. The gasket forms a joint or closure seal that is both electrically and hermetically tight.

There has been a need for a sheet gasket fabricated from a plastic-form material that is highly electrically conductive. Previous methods for forming electrical joints or connections have several disadvantages. For example, soldering can be used but the joint is not easily broken for repairs or modification. Woven wire gaskets when properly placed in a flange make an effective electrical joint, but unless special composite rubber-wire gaskets are used they are not weather tight. Also, woven wire gaskets tend to "disappear" at high frequencies. There is a type of metal-rim waveguide gasket available that has knurling on the metal surfaces which gouges and makes electrical contact with the flange faces. This gasket may have an O-ring molded into a special channel in the metal rim to effect a pressure tight seal. This composite gasket is bulky and can be used reliably only once. It is not too effective at high power applications although generally speaking it has been up to now the best type of seal available for microwave flanges.

It has now been found that an unusually effective gasket for electrical closures can be cut from a flat sheet of a compressible or resilient plastic loaded or filled with metal particles. The metal particles are held in electrical particle-to-particle contact by the plastic binder or matrix. Current can thus flow through the plastic matrix via the metal particles. Volume resistivities are below 10 ohm-cm. and can be as low as 0.001 ohm-cm. or lower.

The gaskets of this invention can have a variety of shapes to match the closure to be sealed. The sheets used can have any convenient thickness, in the range of 4 to 100 mils being preferred.

It has been known to load epoxy adhesives with silver powder to form "plastic solders." These solders have been used for such purposes as attaching leads and terminals as on electroluminescent panels, or for patching cracks and crevices in waveguides. The art has not appreciated up to now, however, that exceedingly effective conductive gaskets or seals can be fabricated from an elastomer loaded with a conductive metal powder.

The conductive plastic seal of this invention has all the advantages of the plastic-form. It is soft, flexible, and resilient and will comply with flange surfaces without scarring them. Properly reinforced, the gaskets can be quite abuse-resistant. While having the advantage of a plastic-form seal, however, they also have the qualities of an electrical seal customarily made from rigid metal.

There are several preferred embodiments of this invention. First, while other shapes such as flat or platelet can be used, it is preferred that the conductive metal filler be a relatively coarse powder, 0.5 to 40 mils average particle size, with a low surface area, ¼ to 250 square feet per pound. A generally spherically shape is also preferred. The point pressure contact between spherical particles is considerably higher which means the possibility of insulating elastomeric films forming between the particles is much less. Also, the loading with a coarse filler that a plastic will accept is considerably higher. The coarse nature of the powder gives the loaded elastomer a gritty nature which assures that good electrical contact will be made with the metal surfaces the gasket contacts. The gritty particles break through the insulating oxide film on a metal surface much more readily than a flat or platelet form will. While fine particles such as silver dust can be used, the conductivity of the system is not as reliable as when coarse particles are used. The fine powders do have an advantage, however, in that plastics filled with them are easier to cast and form than the more highly loaded plastics secured with coarse particles.

Conductivity of a plastic mass filled with a conductive metal powder depends upon the particle-to-particle contact between the metal particles. The electric current must be able to flow from particle-to-particle with desirably the lowest amount of contact resistance possible. The noble metals have been used in the past as the conductive metal powders in plastics because insulating oxide coatings do not form on the particles as is the case with the other metal particles such as copper and aluminum. With the non-noble metals the oxide coating that forms on the particles, while perhaps only a few atoms thick, has a relatively high resistivity and may prevent the ready flow of current between contiguous particles.

It is preferred to use particles that have an outer surface at least of a noble metal and are inherently conductive when in particle-to-particle contact. The particles can be solid noble metal particles or non noble metal particles overcoated with a protective noble metal coating such as silver or gold. It is much preferred in the present case to use the coated powders because they are much less expensive.

The preparations of the two types of the preferred non-noble metal powders coated with a noble metal are described in copending cases "Inexpensive Conductive Metal Filler" S.N. 227,756 and "Iron Based Conductive Filler for Plastics" S.N. 227,755, filed October 2, 1962 by the present inventors.

There is also some preference in the selection of the plastic or elastomer that is used to bind the particles together. Some are easier to load or fill to the high extent that is preferred than others. The elastomeric properties of the plastic, that is, gasket set properties, etc., are of course important because they influence the holding together of the particles in particle-to-particle contact and the outward appearance of the gasket. Generally speaking, the plastic used should have good adhesion to the metal particles to prevent them from becoming loose when the gasket is flexed. Good high and low temperature properties such as offered by a silicone are also preferred.

The compressible plastic loaded with the metal particles is cast into a flat sheet form and then the desired gasket shape is diecut therefrom. This is a particularly useful way for fabricating microwave flange gaskets. The flat sheet form is reinforced with wire screening which considerably improves the abuse resistance of the plastic. The screening is used to gauge or set the thickness of the sheet which is an advantage considering the pasty nature of the plastic when it is so highly loaded as is preferred. Two or more layers of screens can be used if desired.

In addition, the wire reinforced flat sheet stock can be rolled to impress the wire into the gasket and to make the thickness of the gasket more uniform. This improves the properties of the gasket primarily in that the sealing pressure required is much less than is the case where the wire is not impressed within the plastic mass by rolling.

The plastic used to hold the metal particles together can range from a very hard plastic to one that is fairly soft and flexible. The plastic can be foamed to some extent to improve its compressibility.

*Example I*

A highly electrically conductive gasket for sealing a microwave flange was made as follows. A silver coated copper powder was prepared in accordance with the example of the above referred to copending application Serial No. 227,756. Coarse copper powder was first cleaned with an acetic acid wash and then replacement plated with silver from a silver cyanide solution containing an abnormally high amount of cyanide ions. Nine weight percent silver was layed down in the above manner to give an electrically adherent coating. The particles had a particle diameter of 2–3 mils and were generally spherical.

About 89 weight percent of the silver-coated copper powder was incorporated into a polyvinyl chloride plastisol having a curing temperature of 330° F. and a viscosity at room temperature in the uncured state of 160,000 cps. The heavy paste obtained was spread into a 30 mesh-10 mil aluminum wire screen. The filled screen was cured in an oven at 330° F. for 8 minutes. The reinforced sheet obtained had a thickness of about 22 mils. It had a weight of 1.18 grams per inch. About 17 weight percent of the sheet consisted of the wire screen and 83 weight percent consisted of the conductive metal-filled plastic.

In general, the wire reinforcement can amount to 5 to 60 weight percent of the sheet and the conductive plastic 40 to 95 weight percent. The silver coated powder in the conductive plastic can vary from 70 to 93 weight percent.

The cured sheet was rolled (2 passes) in a rolling mill, one customarily used to roll steel sheet, at an average rolling pressure of 850 lbs./in. of width. The reduction obtained was 30% i.e. the final thickness of the sheet was 17 mils. This rolling impressed the screen somewhat into the sheet so that the wire of the screen was not at the surface of the sheet. It is preferred in this method of manufacturing to decrease the thickness of the screen at least 5% by rolling.

A gasket for a 8.6 kilomegacycle (X-band) RG51/U waveguide flange was die-cut from the sheet stock at an angle of 45° F. from the warp of the screen. When tested at an internal air pressure of 25 lb. per sq. inch at 2.5 megawatt peak load and a 2.5 kilowatt average load, the insertion loss for the gasket was 0.005 lb. This was considerably better than the performance obtained from a commercial machined metal-molded O-ring composite seal tested in the same apparatus. In this case, the peak power that could be obtained was only 1.6 megawatts. The isolation afforded by the gasket was in excess of 85 decibels.

In additional tests, a gasket of the same type was able to withstand a continuous load of 6 kilowatts without arcing in a continuous wave X-band testing unit.

The term "plastic" is intended to include resins and elastomers (rubbers) besides the conventionally accepted plastics such as polyethylene and the epoxies. The plastic matrix used can be thermosetting or thermoplastic, depending upon the use to which the gasket is to be put. Asphalts, polyurethanes, polyesters, acrylates and natural rubber are additional examples of suitable matrices.

The term "conductive metal powder" means a particulate powder having an outer surface of a noble metal, such as solid gold powder or the silver coated powder of Example I, which is so inherently conductive when maintained in particle-to-particle contact in loose form (i.e. in the absence of plastic matrix) as to have a volume resistivity of less than 10 ohm-cm. as measured by the probes of a volt-ohm meter, particularly after having been maintained in an oven at 400° F. for 24 hours in the presence of a circulating air atmosphere.

Having described this invention, what is sought to be protected by Letters Patent is succinctly set forth in the following claims:

1. A process for making an electromagnetic energy-shielding flat gasket adapted to seal a joint electrically consisting essentially of the steps of:
   (a) preparing a pasty mixture of a liquid plastic composition that cures to an elastomer containing within the range of 70 to 93 weight percent of a metal powder having a continuous outer surface of a noble metal;
   (b) forming a sheet by spreading the heavy paste so obtained into the interstices of a wire mesh using the wire mesh to set the thickness of the sheet, the amount of said heavy paste and the thickness of said wire mesh being sufficient to yield a sheet having a final thickness in the range of 4 to 100 mils the plane of said wire mesh being parallel to the planes of the two sealing surfaces of the gasket;
   (c) curing said sheet using curing conditions appropriate to the specific liquid plastic composition to convert the same to an elastomer while maintaining the particles of said metal powder in electrical particle-to-particle contact; and
   (d) cutting from said sheet a gasket of a size and shape to fit said joint.

2. The process of claim 1 wherein the average particle size of said metal powder is in the range of 0.5 to 10 mils and the surface area thereof is in the range of 5 to 250 square feet per pound.

3. The process of claim 2 wherein said metal powder is a copper powder.

4. The process of claim 2 wherein said metal powder is a silver-plated copper powder.

5. The process of claim 1 wherein said liquid plastic composition is selected from the group consisting of polyvinyl chloride plastisols, urethanes and silicones.

6. The process of claim 1 wherein said sheet after curing and prior to cutting is rolled under pressure in a rolling mill with cylindrical rolls and wherein the wire mesh of said gasket lies below the two flat surfaces thereof.

References Cited by the Examiner

UNITED STATES PATENTS

| | | | |
|---|---|---|---|
| 2,454,567 | 11/48 | Pierson | 264—273 |
| 3,003,975 | 10/61 | Louis | 252—511 |
| 3,110,836 | 11/63 | Blazek | 174—525 |

FOREIGN PATENTS

| | | |
|---|---|---|
| 1,073,055 | 1/60 | Germany. |
| 519,298 | 8/39 | Great Britain. |

ROBERT F. WHITE, *Primary Examiner.*

JULIUS GREENWALD, *Examiner.*